(12) United States Patent
Trevethan et al.

(10) Patent No.: US 11,496,300 B2
(45) Date of Patent: Nov. 8, 2022

(54) COMPUTER-IMPLEMENTED SYSTEM AND METHOD FOR TIME RELEASE ENCRYPTION OVER A BLOCKCHAIN NETWORK

(71) Applicant: nChain Licensing AG, Zug (CH)

(72) Inventors: Thomas Trevethan, London (GB); Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 129 days.

(21) Appl. No.: 16/624,809

(22) PCT Filed: Jun. 11, 2018

(86) PCT No.: PCT/IB2018/054202
§ 371 (c)(1),
(2) Date: Dec. 19, 2019

(87) PCT Pub. No.: WO2018/234922
PCT Pub. Date: Dec. 27, 2018

(65) Prior Publication Data
US 2020/0136815 A1    Apr. 30, 2020

(30) Foreign Application Priority Data

Jun. 19, 2017 (GB) .................................. 1709760

(51) Int. Cl.
*H04L 29/06* (2006.01)
*H04L 9/08* (2006.01)
(Continued)

(52) U.S. Cl.
CPC ............... *H04L 9/088* (2013.01); *H04L 9/30* (2013.01); *H04L 9/3247* (2013.01); *H04L 9/3297* (2013.01); *H04L 9/50* (2022.05)

(58) Field of Classification Search
CPC ......... H04L 9/088; H04L 9/30; H04L 9/3247; H04L 9/3297; H04L 2209/38; H04L 2209/56; H04L 9/08
See application file for complete search history.

(56) References Cited

U.S. PATENT DOCUMENTS 10,373,129 B1 *  8/2019  James ................... H04L 9/3239
11,120,437 B2 *  9/2021  Wright .................. H04L 9/0891
(Continued)

FOREIGN PATENT DOCUMENTS

CN    106682528 A        5/2017
CN    107408174 B    *  10/2021    ............. G06F 21/31
(Continued)

OTHER PUBLICATIONS

Ivan Puddu et al: 11muchain: How to Forget 1-22 without Hard Forks, I nt erna ti onal Assoc i a ti on for Cryptologic Research,, Feb. 2017, pp. 1-21. (Year: 2017).*
(Continued)

*Primary Examiner* — Sher A Khan
(74) *Attorney, Agent, or Firm* — Davis Wright Tremaine LLP

(57) ABSTRACT

A digital time-lock contract specifies that an agent holds an encryption private key corresponding to an encryption public key on a blockchain network and then releases the encryption private key to the blockchain network within a specified time window. An agent provides a first cryptographic asset for holding and then releasing the encryption private key to the blockchain network, the first cryptographic asset being transferrable when the encryption private key is released to the blockchain network within the specified time window. A client provides a second cryptographic asset to the agent for holding and then releasing the encryption private key to the blockchain network, the second cryptographic asset being transferrable when the
(Continued)

encryption private key is released to the blockchain network within the specified time window. The digital time-lock contract can be broadcast to the blockchain network for mining onto the blockchain.

22 Claims, 3 Drawing Sheets

(51) Int. Cl.
  *H04L 9/30* (2006.01)
  *H04L 9/32* (2006.01)
  *H04L 9/00* (2022.01)

(56) References Cited

U.S. PATENT DOCUMENTS

| | | | |
|---|---|---|---|
| 2015/0271183 A1* | 9/2015 | MacGregor | H04L 67/1097 726/4 |
| 2016/0080149 A1* | 3/2016 | Mehta | H04W 12/08 713/165 |
| 2016/0086175 A1 | 3/2016 | Finlow-Bates et al. | |
| 2016/0260171 A1 | 9/2016 | Ford et al. | |
| 2016/0292680 A1* | 10/2016 | Wilson, Jr. | G06Q 20/40 |
| 2017/0078493 A1 | 3/2017 | Melika et al. | |
| 2017/0132621 A1* | 5/2017 | Miller | G06Q 20/065 |
| 2017/0187535 A1* | 6/2017 | Middleton | G06Q 40/02 |
| 2017/0214664 A1* | 7/2017 | Birgisson | H04L 9/3247 |
| 2017/0221052 A1* | 8/2017 | Sheng | G06Q 20/065 |
| 2017/0230189 A1* | 8/2017 | Toll | H04L 63/0823 |
| 2018/0331832 A1* | 11/2018 | Pulsifer | H04L 9/0637 |
| 2019/0236594 A1* | 8/2019 | Ehrlich-Quinn | G06Q 20/401 |
| 2019/0370792 A1* | 12/2019 | Lam | H04L 9/085 |
| 2020/0136815 A1* | 4/2020 | Trevethan | H04L 9/08 |

FOREIGN PATENT DOCUMENTS

| | | | |
|---|---|---|---|
| WO | 2015171580 A1 | 11/2015 | |
| WO | 2017008084 A1 | 1/2017 | |
| WO | WO-2017090041 A1 * | 6/2017 | H04L 9/3239 |
| WO | 2017132641 A1 | 8/2017 | |

OTHER PUBLICATIONS

Andrychowicz et al., "Secure Multiparty Computations on Bitcoin," IEEE Symposium on Security and Privacy, May 1, 2014, 18 pages.
Antonopoulos, "Mastering Bitcoin13 Unlocking Digital Cryptocurrencies," O'Reilly Media, Inc., Dec. 20, 2014, 282 pages.
Decker et al., "A Fast and Scalable Payment Network with Bitcoin Duplex Micropayment Channels," Symposium on Self-Stabilizing Systems, Aug. 18, 2015, 16 pages.
International Search Report and Written Opinion dated Aug. 23, 2018, Patent Application No. PCT/IB2018/054202, 14 pages.
Jgarzik, "Chat Logs IRC Channel," retrieved from https://download.wpsoftware.net/bitcoin/wizards/2014-08-06.html, Aug. 6, 2014, 15 pages.
Merriam, "Ethereum Alarm Clock Documentation," retrieved from docs.ethereum-alarm-clock.com/en/latest/claiming.html#claim-deposit, Jul. 1, 2017, 51 pages.
Mike et al., "Contract," Bitcoin Wiki, https://en.bitcoin.it/wiki/Contract, Aug. 10, 2017 [retrieved Feb. 5, 2018], 13 pages.
Nakamoto, "Bitcoin: A Peer-to-Peer Electronic Cash System," Bitcoin, Oct. 31, 2008, https://bitcoin.org/bitcoin.pdf, 9 pages.
Poon et al., "Lightning Network," retrieved from https://lightning.network/lightning-network.pdf, Feb. 23, 2015, 54 pages.
Satoshi et al., "Connection Limits," Bitcoin Forum, Aug. 9, 2010, https://bitcointalk.org/index.php?topic=741.0;prev_next=prev, 2 pages.
Sirer et al., "Bitcoin Covenants," retrieved from fc16.ifca.ai/bitcoin/papers/MES16.pdf, Feb. 2016, 16 pages.
Switch, "Dead Man's Switch," retrieved from https://www.deadmansswitch.net/, Dec. 10, 2017, 1 page.
Todd, "[Bitcoin-Development] [BIP Draft] CheckLockTimeVerify—Prevent a Txout from Being Spent Until an Expiration Time," retrieved from https://lists.linuxfoundation.org/pipermail/bitcoin-dev/2014-October/006662.html, Oct. 1, 2014, 6 pages.
UK Commercial Search Report dated Oct. 23, 2017, Patent Application No. GB1709760.1, 11 pages.
UK IPO Search Report dated Jan. 4, 2018, Patent Application No. GB1709760.1, 5 pages.

* cited by examiner

Figure 2

| Number of inputs | | | 2 |
|---|---|---|---|
| Input 1 | Previous transaction | Hash | Deposit UTXO |
| | | Output index | |
| | Signature script [P2PKH] | | \<Agent signature\> \<Agent public key\> |
| | Sequence number | | |
| Input 2 | Previous transaction | Hash | Fee UTXO |
| | | Output index | |
| | Signature script [P2PKH] | | \<Client signature\> \<Client public key\> |
| | Sequence number | | |
| Number of outputs | | | 3 |
| Output 1 | Value | | F |
| | Public key script | | OP_SHA256<br>\<H(EPrivK)\> OP_EQUAL<br>OP_IF<br>  OP_SHA256<br>  \<H(tlpEPrivK)\> OP_EQUAL<br>  OP_NOTIF<br>    \<T\> OP_CHECKLOCKTIMEVERIFY<br>    OP_DROP<br>    \<Agent Pubkey\><br>    OP_CHECKSIG<br>  OP_ELSE<br>    \<Client Pubkey\><br>    OP_CHECKSIG<br>  OP_ENDIF<br>OP_ELSE<br>  \<T+$\Delta$T\> OP_CHECKLOCKTIMEVERIFY<br>  OP_DROP<br>  \<Client Pubkey\><br>  OP_CHECKSIG<br>OP_ENDIF |
| Output 2 | Value | | D |
| | Public key script | | OP_SHA256<br>\<H(EPrivK)\> OP_EQUAL<br>OP_IF<br>  OP_SHA256<br>  \<H(tlpEPrivK)\> OP_EQUAL<br>  OP_NOTIF<br>    \<T\> OP_CHECKLOCKTIMEVERIFY<br>    OP_DROP<br>    \<Agent Pubkey\><br>    OP_CHECKSIG<br>  OP_ENDIF<br>OP_ELSE<br>  \<T+$\Delta$T\> OP_CHECKLOCKTIMEVERIFY<br>  OP_DROP<br>  \<Client Pubkey\><br>  OP_CHECKSIG<br>OP_ENDIF |
| Output 3 | Value | | 0 |
| | Public key script | | OP_RETURN \<EPubK\> |
| Locktime | | | 0 |

COMPUTER-IMPLEMENTED SYSTEM AND METHOD FOR TIME RELEASE ENCRYPTION OVER A BLOCKCHAIN NETWORK

FIELD OF INVENTION

This specification relates generally to digital time-lock contracts for time release encryption. The invention is particularly suited, but not limited, to use with the Bitcoin blockchain.

BACKGROUND OF INVENTION

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a consensus-based, electronic ledger which is implemented as a computer-based decentralised, distributed system made up of blocks which in turn are made up of transactions and other information. In the case of Bitcoin, each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Some network nodes act as miners and perform work to ensure that each transaction is valid, with invalid transactions rejected from the network. For example, software clients installed on the nodes perform this validation work on transactions that reference unspent transaction outputs (UTXO). Validation may be performed by executing its locking and unlocking scripts. If execution of the locking and unlocking scripts evaluate to TRUE and, if certain other conditions are met, the transaction is valid and the transaction may be written to the blockchain. Thus, in order for a transaction to be written to the blockchain, it must be i) validated by a node that receives the transaction—if the transaction is validated, the node relays it to the other nodes in the network; and ii) added to a new block built by a miner; and iii) mined, i.e. added to the public ledger of past transactions. The transaction is considered to be confirmed when a sufficient number of blocks are added to the blockchain to make the transaction practically irreversible.

Although blockchain technology is most widely known for the use of cryptocurrency implementation, digital entrepreneurs have begun exploring the use of both the cryptographic security system Bitcoin is based on and the data that can be stored on the Blockchain to implement new systems.

It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing, etc.) while being more versatile in their applications.

One area of research is the use of the blockchain for the implementation of "smart contracts". These are computer programs designed to automate the execution of the terms of a machine-readable contract or agreement. Unlike a traditional contract which would be written in natural language, a smart contract is a machine executable program which comprises rules that can process inputs in order to produce results, which can then cause actions to be performed dependent upon those results.

Another area of blockchain-related interest is the use of 'tokens' (or 'coloured coins') to represent and transfer real-world entities via the blockchain. A potentially sensitive or secret item can be represented by the token which has no discernible meaning or value. The token thus serves as an identifier that allows the real-world item to be referenced from the blockchain.

As mentioned previously, this specification relates generally to digital time-lock contracts for time release encryption. The basic aim of time-release encryption is that a message can be encrypted at the present time but that it cannot be decrypted by anyone until some specified time in the future. This is in effect a way of "sending messages into the future" or placing messages in a "time capsule". There are many possible applications of this type of functionality, including:

Sealed bid auctions
Key escrow schemes
Receipt-free voting
The timed release of confidential data
"Dead man's switch" for politically sensitive information There are two general approaches to implement a time-release encryption system, which were outlined in the first detailed paper on the idea by Rivest, Shamir and Wagner in 1996 [Rivest 1996]. These are:

1. The use of "time-lock puzzles"—the encryption of information that requires time consuming computational work to decrypt.
2. The use of trusted agents who promise not to reveal secret information until a specified time in the future.

The first of these approaches requires no third party involvement, however there are two serious and unavoidable downsides: firstly, it is not possible to predict with a high precision how long it will take to solve a particular puzzle due to performance differences in computational hardware and unknown future technological innovations. Secondly, the party performing the decryption must perform continuous and costly computational work for the entire duration of the time-lock.

The second approach has the potential to be both accurate and precise in the timing of the release, and also will not require any party to perform expensive computations. However, it does rely on a third party agent who must be trusted to release the correct key at the correct time. The trust in the agent is then crucial—unless the agent can be effectively incentivised to perform the operation correctly.

Background information relating to time-lock encryption on blockchain networks is summarized below.

The "Ethereum Alarm Clock" provides that a user, after having provided a deposit, can execute a transaction at a scheduled period of time. See, for example, URLs: docs.ethereum-alarm-clock.com/en/latest/claiming.html#claim-deposit; and https://github.com/pipermerriam/ethereum-alarm-clock/commits/master/docs/claiming.rst. This allows for scheduling events at a later moment in time and during a specific time window. Moreover, the executer can win back the deposit but can also forfeit it if the execution is not conducted in the specified time window. A payment is also included in the service which is paid to the account that executes the transaction at the scheduled time.

"µchain: How to Forget without Hard Forks" (URL: https://eprint.iacr.org/2017/106.pdf discloses an example of time-lock encryption. In the use case disclosed, a user encrypts a confidential paper. A decryptor can request access to a decryption key by sending a transaction to a smart contract which triggers a function to check if a deadline t has passed. If the time is right then the decryptor acquires the key. It is suggested that the system can provide more advanced features such as making the decryption key available only if requested within a certain time window.

"Secure Multiparty Computations on Bitcoin" (URL: https://eprint.iacr.org/2013/784.pdf) discloses a protocol for multiparty lotteries using the Bitcoin currency. The paper shows that the Bitcoin system provides an attractive way to construct a version of timed commitments where the committer has to reveal his secret within a certain time frame, or to pay a fine. Deposits are provided by participants that are forfeited in the case in which a game terminates prematurely due to participants not acting in an honest manner.

US 2016086175 discloses a blockchain system for accessing a property. The room has a private/public key pair along with an address to which credits are deposited by a user wishing to rent a room for a certain duration; such data are included in a transaction. When the time is right, the lock opens and the user is allowed to enter the room. A fee is paid by the user to the room provider to gain access to the room that is refunded if the room is not available during the time required.

SUMMARY OF INVENTION

This specification describes a system and method that enables a time release encryption service to be secured via a permission-less, public blockchain. The service generates a public key and then releases the corresponding private key at a future time specified by the client of the service. The security and reliability of this service is derived from a novel smart contract system, implemented in one example as Bitcoin scripts, which incentivise the release of the private key at the correct time and penalises the early or late release or leaking of the key. The service is designed to be trustless: the client is not given access to the private key, however they only provide a cryptographic asset for the service with a guarantee that the correct value will be revealed on the blockchain at the specified time in the contract. In one example, this is achieved with a zero-knowledge proof combined with the time-locking and hash-locking of transaction outputs.

According to a first aspect of the invention there is provided a computer-implemented method for generating a encryption public key on a blockchain network and enabling access to a corresponding encryption private key after a specified time period, the method comprising one or both of:

constructing a digital time-lock contract between an agent and a client on the blockchain network, the agent having an agent address on the blockchain network and an associated agent signature, and the client having a client address on the blockchain network and an associated client signature, the digital time-lock contract specifying that:
(i) the agent holds the encryption private key corresponding to the encryption public key on the blockchain network and then releases the encryption private key to the blockchain network within a specified time window;
(ii) the agent provides a first cryptographic asset (e.g. a deposit) for holding and then releasing the encryption private key to the blockchain network within the specified time window, the first cryptographic asset being transferrable to the agent address on the blockchain network when the encryption private key is released to the blockchain network within the specified time window;
(iii) the client provides a second cryptographic asset (e.g. a fee) to the agent for holding and then releasing the encryption private key to the blockchain network within the specified time window, the second cryptographic asset being transferrable to the agent address on the blockchain network when the encryption private key is released to the blockchain network within the specified time window,
(iv) if the encryption private key is released prior to the time window opening then the second cryptographic asset is transferrable to the client address on the blockchain network (the client or anyone else may use the private key to take the first cryptographic asset of the agent);
(v) if the encryption private key is not released prior to the time window closing then the second cryptographic asset is transferrable to the client address on the blockchain network (the first cryptographic asset may also be transferrable to the client address on the blockchain network); and broadcasting said digital time-lock contract to the blockchain network for mining onto the blockchain.

The steps of constructing the digital time-lock contract and broadcasting the contract may be performed by the same entity. However, it is also envisaged that these steps may be performed by different entities. Hence the aforementioned definition specifies one or both of the steps being required by any single entity.

It should be noted that the invention as described herein is not merely in the provision of a blockchain implemented time-lock contract as a better way of conducting business. The starting point for the invention is that implementing time-lock contracts using cryptographic methods is known. However, these prior art systems have technical problems. The technical problem with the prior art methods is that they are either not secure or otherwise they are difficult to use and can be computationally intensive. These problems are technical in nature. The present invention provides a solution which is both secure and also easy to utilize and computationally efficient. That is, the present invention provides a better computer system in terms of providing a system which combines security and low computational overheads for implementing time-lock contacts in a trustless manner. Providing a combination of security, ease of use, and computational efficiency are the technical contributions of the present invention.

The computer-implemented method can be initiated by the client sending a request indicating a desire to set up a digital time-lock contract. The client can specify the second cryptographic asset and the time window. The agent can then construct the encryption public key and encryption private key pair. The agent can then also construct the digital time-lock contract. The digital time-lock contract can become active after it has been mined into the blockchain and the encryption public key is publically available to be used for encrypting data that then cannot be decrypted until the encryption private key is released.

The time window can be specified as a time t at which the time window opens and a time period $\Delta t$ after which the time window closes. The digital time-lock contract can be constructed such that one or more of the following transfers are possible:

the second cryptographic asset is transferrable to the client address at any time with the encryption private key, a time-lock puzzle value derivable from the encryption private key, and the client signature;

the second cryptographic asset is transferrable to the agent address after time t with the encryption private key and the agent signature;

the second cryptographic asset is transferrable to the client address after time $t+\Delta t$ with the client signature;

the first cryptographic asset is transferrable to any address at any time by providing the encryption private key and a time-lock puzzle value derivable from the encryption private key;

the first cryptographic asset is transferrable to the agent address after time t with the encryption private key and the agent signature.

the first cryptographic asset is transferrable to the client address after time $t+\Delta t$ with the client signature.

In light of the above, another definition of a computer-implemented method for generating a encryption public key on a blockchain network and enabling access to a corresponding encryption private key after a specified time period comprises one or both of:

constructing a digital time-lock contract between an agent and a client on the blockchain network, the agent having an agent address on the blockchain network and an associated agent signature, and the client having a client address on the blockchain network and an associated client signature, the digital time-lock contract specifying:

a first cryptographic asset (e.g. a deposit) from the agent;

a second cryptographic asset (e.g. a fee) from the client;

an encryption public key; and a time window during which the agent should release an encryption private key corresponding to the encryption public key, the time window defined by a time t at which the time window opens and a time period $\Delta t$ after which the time window closes, wherein the digital time-lock contract is constructed such that the following transfers are possible:

the second cryptographic asset is transferrable to the client address at any time with the encryption private key, a time-lock puzzle value derivable from the encryption private key, and the client signature;

the second cryptographic asset is transferrable to the agent address after time t with the encryption private key and the agent signature; the second cryptographic asset is transferrable to the client address after time $t+\Delta t$ with the client signature;

the first cryptographic asset is transferrable to any address at any time by providing the encryption private key and a time-lock puzzle value derivable from the encryption private key;

the first cryptographic asset is transferrable to the agent address after time t with the encryption private key and the agent signature; and the first cryptographic asset is transferrable to the client address after time $t+\Delta t$ with the client signature, and broadcasting said digital time-lock contract to the blockchain network for mining onto the blockchain.

The agent may enter into a plurality of digital time-lock contracts with a plurality of clients. The agent can be a single agent who holds the private key. Alternatively, the agent may comprise a plurality of agents who each hold a share of the encryption private key. In this case, derivation of the encryption private key is effected by a threshold of private key shares being provided by the plurality of agents. The first cryptographic asset and the second cryptographic asset is then split between the agents. The security and reliability of the service can be made even stronger by extending the core protocol to a group of independent service providers each with individual contracts, distributing the time release of the private key using a dealer-free secret sharing (m-of-n) threshold scheme, therefore tolerating a sub threshold number of dysfunctional service providers. We describe an extended zero-knowledge proof system that enables the client to prove that the private key shares corresponding to the shared public key will be released to unlock the contracts before any fees are paid.

The client can provide a service to a plurality of end users based on the digital time-lock contract. For example, the service may be one or more of: a sealed bid auction; a key escrow scheme; a voting scheme; a time release of confidential data.

The computer-implemented method as described herein can be implemented by providing a computer readable storage medium comprising computer-executable instructions which, when executed, configure a processor to perform the method as described herein. Furthermore, an electronic device can be provided comprising: an interface device; a processor coupled to the interface device; and a memory coupled to the processor, the memory having stored thereon computer executable instructions which, when executed, configure the processor to perform the method as described herein.

The invention as described herein is distinct over the prior art discussed in the background section as set out below.

The Ethereum Alarm Clock system is significantly different from the presently described system in that it does not disclose that an agent holds a encryption private key relating to a public key and then releases the private key within a specified time window, where a digital contract is provided to manage this system to ensure that the agent releases the encryption private key at the correct time. Furthermore, the prior art system does not enable the usage of a public key for a specified amount of time during which data associated with the usage is encrypted and then release a private key to enable decryption of the data associated with the usage.

The system described in "µchain: How to Forget without Hard Forks" also seems to be significantly different from the presently described system in that it does not disclose that an agent holds a encryption private key relating to a public key and then releases the private key within a specified time window, where a digital contract is provided to manage this system to ensure that the agent releases the encryption private key at the correct time. The prior art system does not appear to enable the usage of a public key for a specified amount of time during which data associated with the usage is encrypted and then release a private key to enable decryption of the data associated with the usage, where the release of the private key is subject to provisions which ensure its release at the correct time. Rather, in the µchain document the decryption key is generated by the user of the system rather than being generated by an agent. That is, the user remains in control of the release of the decryption key and thus the system is reliant on trusting the user. The user can thus readily breach security.

Similarly "Secure Multiparty Computations on Bitcoin" and US 2016086175 also describe systems which are significantly different from the presently described system in that they do not disclose that an agent holds a encryption private key relating to a public key and then releases the private key within a specified time window, where a digital contract is provided to manage this system to ensure that the agent releases the encryption private key at the correct time.

BRIEF DESCRIPTION OF THE DRAWINGS

These and other aspects of the present invention will be apparent from and elucidated with reference to, the embodiments described herein. Embodiments of the present invention will now be described, by way of example only, with reference to the accompany drawings, in which:

FIG. 2 shows an example of transaction script for constructing a digital time-lock contract between a client and an agent;

DETAILED DESCRIPTION

Figure 1:
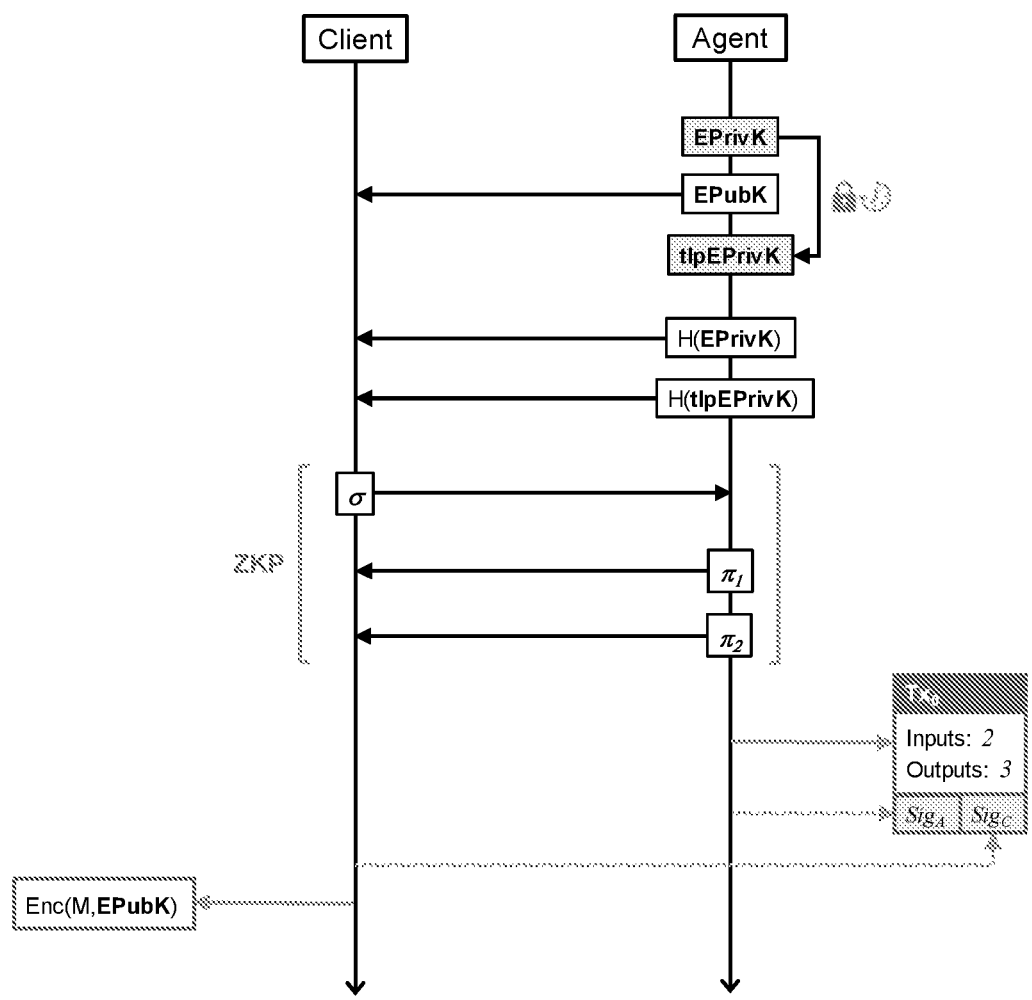
FIG. 1 shows a flow diagram of an initialisation protocol for setting up a digital time-lock contract between a client and an agent after establishment of a communication channel between the client and agent.

The advent of the Bitcoin blockchain has resulted in a system where there is both distributed global consensus on the current time (as recorded in the block header) and trustless, automatic execution of contracts (scripts). These are unique features that can be exploited for the realisation of a secure and reliable time release encryption service. In this specification, we describe a system for a time release encryption service that employs a combination of Bitcoin script-based smart contracts and zero-knowledge proofs that does not rely on complete trust in a service provider. In addition, we show how the protocol can be extended using a dealer-free threshold scheme to employ multiple agents for a single key release, increasing the resilience and security of the service through decentralisation.

Certain configurations employ the concept of zero-knowledge proofs (ZKP) of knowledge to enable the protocol to be completely trustless. There are two techniques that may be used as part of the scheme: non-interactive proofs; and cut-and-choose.

Non-interactive zero-knowledge (NIZK) proofs are preferable for this application as they minimise the communication required between the parties involved, however they can be complex and computationally expensive to implement. Formally, a NIZK proof can be provided directly from a prover to a verifier without interaction, however in this case they require a trusted set-up ($\sigma$). In the present application, the verifier can perform the trusted-set up and then send this to the prover who then computes the proof ($\pi$) and sends this back to the verifier.

In a first application we require a zero-knowledge proof that the pre-image of a hash (provided to the verifier) equals the private key corresponding to an elliptic curve public key (also provided to the verifier). The mathematical structure of this particular NIZK is described in detail in [Fuchsbauer 2008]. This NIZK proof can be implemented with zkSNARKS [Lundkvist 2017].

In a second application using an extended system, the construction of an efficient NIZK proof is challenging. In this case, a simplified interactive type of ZKP called cut-and-choose can be employed [Crepeau 2011]. In this approach the prover provides the verifier with a large number of commitments to different statements. The verifier then randomly selects a sub-set of these commitments and requests that the prover sends the knowledge to prove them. When this sub-set of statements are shown to be true, the verifier knows the probability that the remaining statements are also true.

Certain configurations employ several standard features of the Bitcoin transaction Script to enable time-locking of outputs as well as the use of hash locks.

Bitcoin outputs can be constructed such that the unlocking script is required to provide a secret that hashes to a specified value (e.g. using the HASH256 opcode). That is, to spend an output the input must provide a value that hashes to another value specified in the output [Maxwell 2016].

An output can also be constructed such that it is unspendable until some pre-specified point in the future. This is achieved using the CHECKLOCKTIMEVERIFY (CLTV) opcode, which can be used to prevent a spending transaction until either a specified unix epoch time or specified block height is reached [Todd 2014].

To secure the smart contract structure, a novel application of a brief time-lock puzzle is employed to prevent 'race attacks'. The successive squaring time-lock puzzle can be used [Rivest 1996] which requires negligible computational work to set up (locking an output). For a second party, who does not possess the set-up parameters, a set number of serial computations (taking a certain amount of time) must be performed on the input to unlock the puzzle and reveal the output value.

In one configuration of a time-release encryption scheme via a trusted agent, the agent creates a public-private key pair (using a public key cryptosystem) and releases the public key for a client to use to encrypt information which they then send to a receiver. Then, at the agreed time (as determined by the agent) the agent releases the private key to the receiver to decrypt the information. In this case the agent needs to be completely trusted to perform this action, and keep the private key secure.

Rabin and Thorpe [Rabin 2006] proposed a system to enhance the security and fault tolerance of this configuration by distributing the key generation among a group of somewhat trustworthy agents so that, even if some of the parties are dishonest or compromised, none of them can learn the full private key until a threshold of the agents agree that it is the correct time to release them.

In this system, a networked group of agents (n) cooperate using a dealer-free threshold (m-of-n) secret sharing scheme to generate a shared private key and corresponding shared public key which is then released to a client (who can then encrypt a message). Only when a threshold (m) of agents agree that the time has been reached to release the key, can the full private key be reconstructed and sent to the receiver.

Shamir's secret sharing scheme (SSSS) [Shamir 1979] is based on the concept that a polynomial of degree t can be fit to any set of t+1 points. A polynomial $f(x)$ of degree t is formed with the shared private key as the constant term ($a_0$=f(0)) and the remaining coefficients are picked at random. n points on the curve are then given to each participant. If m=t+1 or more of the participants then combine their points, there is sufficient information to fit the order t polynomial to these points, and $a_0$ is revealed as the secret. This scheme enables the sharing of a single private key among an arbitrarily large number of parties with any threshold.

The standard SSSS can be extended to remove the requirement of a trusted dealer to create the polynomial and distribute the secret shares (which is a single point of failure and therefore not trustless). In this dealer-free SSSS, each participant $P_i$ generates their own random degree t polynomial $f_i(x)$, and then securely sends $f_i(j)$ to each other participant $P_j$. Each $P_i$ then sums all the received points $f_1(i)+f_2+ \ldots +f_n(i)$ to obtain their secret share $s_i$=f(i) which is the $P_i$ point on the shared polynomial f(x).

After the secret shares have been created, the public key corresponding to the shared private key (which no participant knows) is computed as follows (with Elliptic Curve generator G):

Participants $P_i$, where i=1, ..., t+1, compute their public key shares as $b_i s_i \times G$, where $$b_i = \prod_{j \in U, j \neq i} \frac{i}{j-i}$$

These public key shares are then broadcast and the shared public key A is then calculated simply as the sum of t+1 shares:

$$A = \sum_{i=1}^{t+1} b_i s_i \times G$$

Single Agent Protocol

This section describes configurations for the case of a single agent providing a time-release encryption service. The protocol is described in relation to Bitcoin transactions and its native scripting language (Script) without loss of generality, but is applicable to any cryptocurrency system with a public blockchain and equivalent scripting functionality.

The protocol directly involves two parties:

The client specifies the parameters of the required time-lock encryption service and pays a fee (F) for it. The client controls the address CAddr.

The agent performs the time-lock encryption service and receives the fee on successful completion. The agent provides a deposit (D) which is forfeited if the service is not performed correctly. The agent controls the address AAddr.

FIG. 1 shows a flow diagram of an initialisation protocol for setting up a digital time-lock contract between a client and an agent after establishment of a communication channel between the client and agent. The set-up proceeds as follows:

1. The client posts a request for the time-lock service in a public forum. The request consists of the client address (CAddr), the fee they are willing to pay (F), the time (T) after which they require the key to be released and the required latency (Δt).

2. An agent who wishes to perform the service contacts the client and establishes a secure communication channel. The client sends the transaction ID of the UTXO to be used for the fee.

3. The agent then securely generates a random encryption private key (EPrivK) and corresponding public key (EPubK).

4. The agent then calculates a value tlpEPrivK—which is a time-lock puzzle output from EPrivK—requiring approximately 1 hour of serial computation to calculate from EPrivK as an input (the typical bitcoin blockchain transaction confirmation time).

5. The agent then sends EPubK, the SHA-256 hash of the corresponding private key H(EPrivK) and H(tlpEPrivK) to the client.

6. The client performs the NIZK proof set-up: σ←Setup ($1^{256}$) and sends the result to the agent.

7. The agent constructs the proof $\pi_1$←Prove(σ, H(EPrivK), EPubK) that the preimage of H(EPrivK) is the ECC private key corresponding to EPubK, and the proof $\pi_2$←Prove(σ, H(tlpEPrivK), H(EPrivK)) that the pre-image of H(tlpEPrivK) is the pre-image of H(EPrivK) with a time-lock puzzle of ~1 hour and sends them to the client.

8. The client verifies both proofs: Verify(σ, H(EPrivK), $\pi_1$)=true and Verify(σ, H (tlpEPrivK, $\pi_2$)=true 9. The agent then creates a transaction (Tx0) that will function as the time-lock encryption smart contract, using the request parameters, the hash of the encryption private key (EPrivK) and the hash of tlpEPrivK.

Tx0 has 2 inputs: the client fee (F) UTXO and the agent deposit (D) UTXO.

Tx0 has 3 outputs: Output 1 for the fee amount, Output 2 for the deposit amount and Output 3 for the encryption public key metadata.

Output 1:
Pays (F) to the client address at any time with EPrivK, the tlpEPrivK and the client signature.
Pays (F) to the agent address after time T with EPrivK and the agent signature.
Pays (F) to the client address after time T+ΔT with the client signature.

Output 2:
Pays (D) to any address at any time with EPrivK and the tlpEPrivK.
Pays (D) to the agent address after time T with EPrivK and the agent signature.
Pays (D) to the client address after time T+ΔT with the client signature.

Output 3:
OP_RETURN containing the encryption public key (EPubK) as metadata.

FIG. 2 shows the full transaction structure. Note, for clarity in FIG. 2< ... PubKey> is substituted for OP_DUP OP_HASH160<pubKeyHash> OP_EQUALVERIFY where pubKeyHash is equivalent to address. Outputs 1 and 2 may be implemented as P2SH (pay-to-script-hash) scriptPubKey with the corresponding redeem scripts sent to the relevant parties and/or published.

10. The agent signs the transaction and sends it to the client.
11. The client signs the transaction and broadcasts it to the Bitcoin network.
12. Once the transaction is mined into the blockchain, the time-lock contract is active. EPubK is now publically available to be used for encrypting any data that then cannot be decrypted until EPrivK is released.

Figure 3:
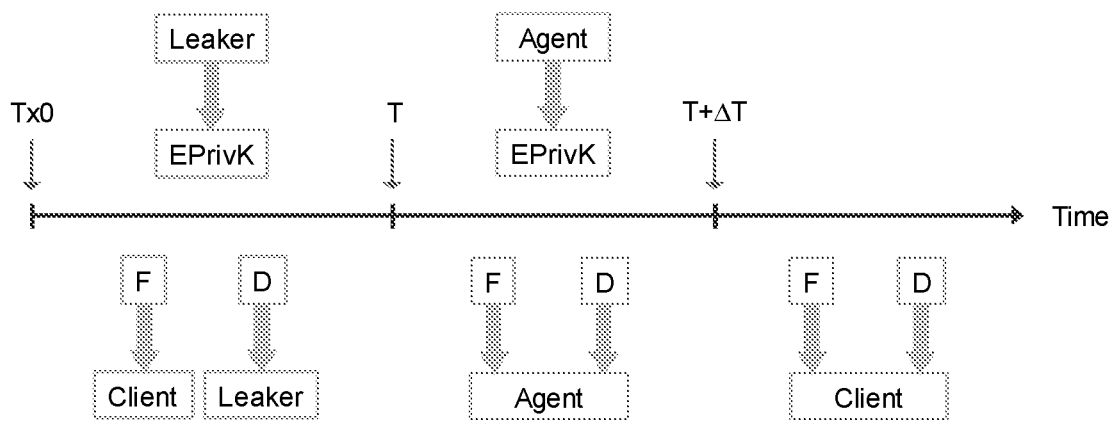
FIG. 3 shows a schematic time-line of a digital time-lock contract and the destination of outputs depending on the time period.

FIG. 3 shows a schematic time-line of a digital time-lock contract and the destination of outputs depending on the time period. The contract is designed to ensure that the agent releases the encryption private key (EPrivK) within the time interval T to T+ΔT, in order to claim both the fee and the deposit. To do this, the agent creates two transactions Tx1 (spending Tx0 Output 1) and Tx2 (spending Tx0 Output 2). The scriptSig to unlock the outputs both contain <EPrivK><AAddr Pubkey><AAddr Sig>. Tx1 and Tx2 then pay both F and D to addresses chosen by the agent. Once these transactions are mined into the blockchain EPrivK is then publically released, and can be used by anyone.

To disincentivise the agent from revealing EPrivK to anyone before time t (possibly in exchange for a bribe), the contract is designed so that anyone who learns EPrivK before time T can spend Output 2 by providing the hash pre-image (and the corresponding time-lock puzzle tlpEPrivK—see race attack protection below) without a signature and then claim the full agent deposit—this party is referred to as the leaker. Once this occurs, the client then also learns EPrivK and can spend Output 1 with scriptSig <EPrivK><CAddr Pubkey><CAddr Sig> before time T—reclaiming the client fee.

This provides a strong incentive structure for the agent to keep EPrivK secure. If anyone (including a hacker) discovers EPrivK before time T they can anonymously claim the agent's deposit. If the agent claims the deposit as the leaker (or allows this) before time T they will forfeit the fee (which is refunded to the client). Therefore, the choices of the values for the fee and deposit affect the security of the system and should be appropriate for the reason for the encryption request.

The contract is also designed to make sure the agent releases the encryption key after time T but before time T+ΔT (where ΔT is the required latency). After time T+ΔT the client can unlock both output 1 and output 2 (re-claiming the fee and also taking the agent's deposit as compensation) if EPrivK has not been released. In this case the client creates two transactions TxR1 (spending Tx0 output 1) and TxR2 (spending output 2) both with scriptSig <CAddr Pubkey><CAddr Sig> and paying both F and D to addresses chosen by the client.

The nature of the bitcoin scripting language means that, although it is possible to prevent an output from being spent until some point in time (with OP_CHECKLOCKTIMEVERIFY), it is not possible to prevent an output from being spent after a point in time (where it was spendable before that time). Therefore, once a scriptSig becomes valid, it remains valid indefinitely. This presents an issue with the locking script for Output 2 where anyone could spend it by providing EPrivK—at any time—even after time T—with only the pre-image of H(EPrivK) required.

This would enable a 'race double spending attack' against the agent: once the agent has correctly broadcast Tx1 and Tx2 to the Bitcoin network (after time T), any miner could extract EPrivK from either of them while they are in the mempool and include their own anyone-can-spend transaction in a block (or anyone else can use replace-by-fee) to spend output 2 first and steal the deposit.

The solution implemented here to prevent this attack is the additional requirement for tlpEPrivK (the time-lock puzzle output from EPrivK) to be provided along with EPrivK to unlock output 2 at any time. If someone (the leaker) comes into possession of EPrivK before time T, they can privately determine tlpEPrivK with 1 hour of computation and then claim the deposit (i.e. unlock output 2). If they obtain EPrivK for the first time (after time T) when it is embedded in Tx1 and Tx2 waiting to be mined in the mempool, by the time they have derived tlpEPrivK (1 hour of computation), the agent transaction that spends output 2 (Tx2) will have already been confirmed in the blockchain. A consequence of the race attack prevention is that it is possible for the agent to release EPrivK less than 1 hour before time T without the risk of forfeiting the deposit, since tlpEPrivK will take an hour to derive. This limits the 'time resolution' or accuracy of the contract to 1 hour.

Multiple Agent Protocol

The smart-contact protocol described above can be extended to the case of multiple agents with a threshold private key. In this case, each agent creates their own version of Tx0, with their own deposit and with a separate fee. The only difference is that the private key (EPrivK) hashes and public key (EPubK) are replaced with hashes of private key shares and a shared public key, respectively. Each contract is executed independently, and the key shares are revealed on the blockchain after time T. Since a threshold of key shares are required to reconstruct the full private key, the system is tolerant of a sub-threshold number of agents who are dysfunctional—removing the single point of failure (the single agent) for more critical and important applications. The main technical differences required for this extended protocol involve the dealer-free generation of the shared keys, and a multi-party zero-knowledge proof system that enables the group of agents to collectively prove that the pre-images of the hashes of their private key shares correspond the published shared public key.

The multi-agent protocol then involves the following participants:

The client who specifies the parameters of the required time-lock encryption service and pays a total fee (F) for it (split among n UTXOs). The client controls the address CAddr.

n independent agents collectively perform the service and each receive a fraction (F/n) of the fee if they perform the protocol correctly. Each agent provides a deposit (D) which is forfeited if the protocol is not performed correctly. Each agent (i=1, 2, . . . , n) controls the address $AAddr_i$.

Figure 4:
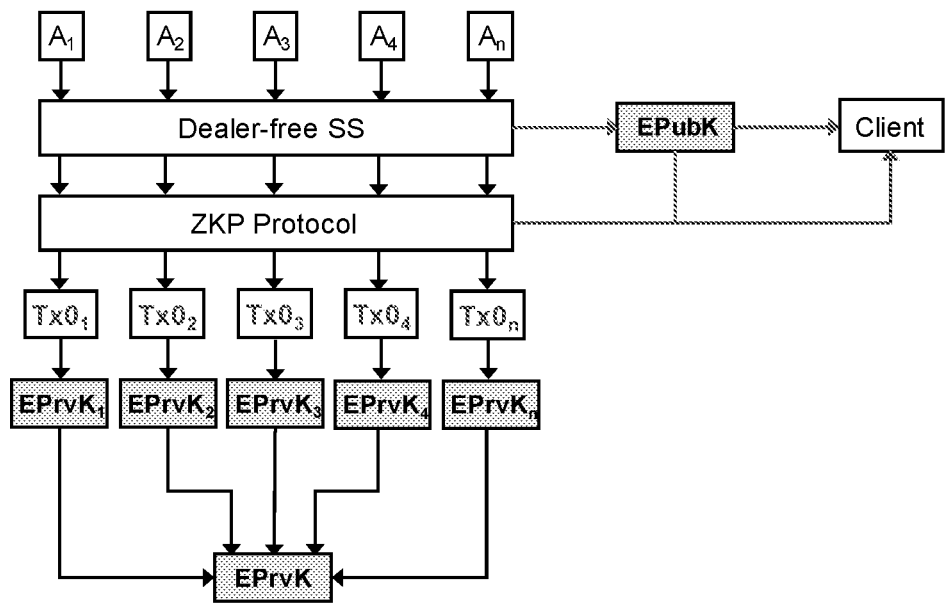
FIG. 4 shows a schematic of a multi-agent protocol.

FIG. 4 shows a schematic of a multi-agent protocol. The set-up proceeds as follows:

1. The client posts a request for the time-lock service in a public forum. The request consists of the client address (CAddr), the fee they are willing to pay (F), the time (T) after which they require the key to be released, the required latency (Δt), the required number of agents (n) and the required threshold (m).

2. n agents who wish to perform the service contact the client and establish secure communication channels. The client sends the transaction ID of the UTXO to be used for the fee.

3. The client then broadcasts the contact details of each of the agents to the group, and each agent establishes secure communication with each other agent in the group (via a public key cryptosystem or Diffie-Hellman key exchange).

4. The players then collectively execute the dealer-free secret sharing protocol with threshold m generate a shared secret: EPrivK (the encryption private key). Each player (i=1, . . . , n) then possesses the key share: sEPrivKi. (EPrivK is not known by any party).

5. The group of n players then calculate their public key shares for each private key share and broadcast these shares (sEPubKi) to the rest of the group. Each player can then independently calculate the corresponding shared public key: EPubK.

6. Each agent (i=1, . . . , n) then calculates a value tlpsEPrivKi—which is time-lock puzzle output from sEPrivKi—requiring approximately 1 hour of serial computation to calculate from sEPrivKi as the input.

7. Each agent (i=1, . . . , n) agent then sends EPubK, the SHA-256 hash of their corresponding private key share H(sEPrivKi) and H(tlpsEPrivKi) to the client.

8. The group of agents then collaborate to provide a zero knowledge proof to the client that the pre-images of the hashes of their private key shares can, with a threshold m be used to reconstruct the private key corresponding to EPubK. The development of a NIZK proof for this is a substantial task and may be prohibitively expensive, however the 'cut-and-choose' method can be employed relatively efficiently. In this case the group of n agents repeat steps 4 to 7 a large (N=100 to 1000) number of times. The client then randomly chooses one of the shared public keys and requests that the group reveal the private key shares for the remaining N−1 public keys. The client confirms that both the private key shares can reconstruct the private key corresponding to each shared public key, and that the private key shares are the pre-images of the sent hashes. This then confirms that there is a less than (N−1)/N chance that the agents are dishonest. Any agent found providing invalid key shares or hashes can be eliminated from the protocol and replaced (and the process repeated). The randomly chosen shared public key (and corresponding private key share hashes) are then used in the protocol for the n transactions.

9. Each agent (i=1, . . . , n) then creates a transaction (Tx0i) of exactly the same structure as FIG. 1, using the request parameters, the hash of the encryption private key (EPrivK) and the hash of tlpEPrivK.

Each Tx0i has 2 inputs: the client fee share (F/n) UTXO and the agent deposit (D) UTXO.

Each Tx0i has 3 outputs: Output 1 for (F/n), Output 2 for the D and Output 3 for the EPubK metadata.

Tx0i Output 1:
Pays (F/n) to the client address at any time with sEPrivKi, the tlpEPrivK and the client signature.
Pays (F/n) to the agent address after time T with sEPrivKi and the agent signature.
Pays (F/n) to the client address after time T+ΔT with the client signature.

Tx0i Output 2:
Pays (D) to any address at any time with sEPrivKi and the tlpsEPrivKi.
Pays (D) to the agent address after time T with sEPrivKi and the agent signature.
Pays (D) to the client address after time T+ΔT with the client signature.

Tx0i Output 3:
OP_RETURN containing the encryption public key (EPubK) as metadata.

10. Each agent signs their corresponding transaction and sends it to the client.

11. The client signs each of the n transactions and broadcasts them to the Bitcoin network.

12. Once the transactions are mined into the blockchain, EPubK is now publically available to be used for encrypting any data that then cannot be decrypted until EPrivK is revealed from a threshold number (m) of key shares sEPrivKi being released by agents.

Each individual contract (Tx0i) is executed in the same way as the single agent contract previously described. Each agent risks losing their deposit if their key share is leaked before time T. They are each individually incentivised to release their key share after time T to claim back their deposit and their share of the fee. The execution of each separate contract is completely independent of each other.

This system will then tolerate a sub-threshold (n−m) number of participants failing to release their key-shares at the correct time, or leaking them early, without compromising the security or reliability of the service. For each agent that does not release their key share before time T+ΔT, the client can claim their fee share back and the dysfunctional agent deposit.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

REFERENCES

[Abliz 2009]: Abliz, Mehmud, and Taieb Znati. "A guided tour puzzle for denial of service prevention." Computer Security Applications Conference, 2009. ACSAC'09. Annual. IEEE, 2009.

[Fuchsbauer 2008]: Fuchsbauer, Georg, and David Pointcheval. "Encrypting Proofs on Pairings and Its Application to Anonymity for Signatures." IACR Cryptology ePrint Archive 2008 (2008): 528.

[Lundkvist 2017]: https://media.consensys.net/introduction-to-zksnarks-with-examples-3283b554fc3b

[Crepeau 2011]: Crépeau, Claude. "Cut-and-choose protocol." Encyclopedia of Cryptography and Security. Springer US, 2011. 290-291.

[Maxwell 2016]: https://bitcoincore.org/en/2016/02/26/zero-knowledge-contingent-payments-announcement/

[Todd 2014]: https://github.com/bitcoin/bips/blob/master/bip-0065.mediawiki

The invention claimed is:

1. A computer-implemented method for generating an encryption public key on a blockchain network and enabling access to a corresponding encryption private key after a specified time period, the method comprising steps of:
  constructing a digital time-lock contract between an agent and a client on the blockchain network, the agent having an agent address on the blockchain network and an associated agent signature, and the client having a client address on the blockchain network and an associated client signature, the digital time-lock contract causing that:
    (i) the agent holds the encryption private key corresponding to the encryption public key on the blockchain network and then releases the encryption private key to the blockchain network within a specified time window;
    (ii) the agent provides a first cryptographic asset for holding and then releasing the encryption private key to the blockchain network within the specified time window, the first cryptographic asset being transferrable to the agent address on the blockchain network when the encryption private key is released to the blockchain network within the specified time window;

(iii) the client provides a second cryptographic asset to the agent for holding and then releasing the encryption private key to the blockchain network within the specified time window, the second cryptographic asset being transferrable to the agent address on the blockchain network when the encryption private key is released to the blockchain network within the specified time window;

(iv) if the encryption private key is released prior to the time window opening then the second cryptographic asset is transferrable to the client address on the blockchain network; and (v) if the encryption private key is not released prior to the time window closing then the second cryptographic asset is transferrable to the client address on the blockchain network; and broadcasting said digital time-lock contract to the blockchain network for mining onto a blockchain.

2. The computer-implemented method of claim 1, wherein in step (iv) the client or anyone else can use the encryption private key to take the first cryptographic asset of the agent.

3. The computer-implemented method of claim 1, wherein in step (v) the first cryptographic asset is also transferrable to the client address on the blockchain network.

4. The computer-implemented method of claim 1, wherein the computer-implemented method is initiated by the client sending a request indicating a desire to set up a digital time-lock contract.

5. The computer-implemented method of claim 4, wherein the client specifies the second cryptographic asset and the time window.

6. The computer-implemented method of claim 1, wherein the agent constructs the encryption public key and encryption private key pair.

7. The computer-implemented method of claim 1, wherein the agent constructs the digital time-lock contract.

8. The computer-implemented method of claim 1, wherein the digital time-lock contract becomes active after it has been mined into a blockchain and the encryption public key is publically available to be used for encrypting data that then cannot be decrypted until the encryption private key is released.

9. The computer-implemented method of claim 1, wherein the time window is specified as a time t at which the time window opens and a time period $\Delta t$ after which the time window closes.

10. The computer-implemented method of claim 9, wherein the second cryptographic asset is transferrable to the client address at any time with the encryption private key, a time-lock puzzle value derivable from the encryption private key, and the client signature.

11. The computer-implemented method of claim 9, wherein the second cryptographic asset is transferrable to the agent address after time t with the encryption private key and the agent signature.

12. The computer-implemented method of claim 9, wherein the second cryptographic asset is transferrable to the client address after time $t+\Delta t$ with the client signature.

13. The computer-implemented method of claim 9, wherein the first cryptographic asset is transferrable to any address at any time by providing the encryption private key and a time-lock puzzle value derivable from the encryption private key.

14. The computer-implemented method of claim 9, wherein the first cryptographic asset is transferrable to the agent address after time t with the encryption private key and the agent signature.

15. The computer-implemented method of claim 9, wherein the first cryptographic asset is transferrable to the client address after time $t+\Delta t$ with the client signature.

16. The computer-implemented method of claim 1, wherein the agent enters into a plurality of said digital time-lock contracts with a plurality of clients.

17. The computer-implemented method of claim 1, wherein the agent is a single agent who holds the encryption private key.

18. The computer-implemented method of claim 1, wherein the agent comprises a plurality of agents who each hold a share of the encryption private key,
derivation of the encryption private key is effected by a threshold of private key shares being provided by the plurality of agents, and
the first cryptographic asset and the second cryptographic asset is split between the agents.

19. The computer-implemented method of claim 1, wherein the client provides a service to a plurality of end users based on said digital time-lock contract.

20. The computer-implemented method of claim 19, wherein the service is one or more of: a sealed bid auction; a key escrow scheme;
a voting scheme; a time release of confidential data.

21. A non-transitory computer readable storage medium comprising computer-executable instructions that, when executed, cause a processor to perform steps that:
construct a digital time-lock contract between an agent and a client on the blockchain network, the agent having an agent address on the blockchain network and an associated agent signature, and the client having a client address on the blockchain network and an associated client signature, the digital time-lock contract causing that:
(i) the agent holds the encryption private key corresponding to the encryption public key on the blockchain network and then releases the encryption private key to the blockchain network within a specified time window;
(ii) the agent provides a first cryptographic asset for holding and then releasing the encryption private key to the blockchain network within the specified time window, the first cryptographic asset being transferrable to the agent address on the blockchain network when the encryption private key is released to the blockchain network within the specified time window;
(iii) the client provides a second cryptographic asset to the agent for holding and then releasing the encryption private key to the blockchain network within the specified time window, the second cryptographic asset being transferrable to the agent address on the blockchain network when the encryption private key is released to the blockchain network within the specified time window;

(iv) if the encryption private key is released prior to the time window opening then the second cryptographic asset is transferrable to the client address on the blockchain network; and
(v) if the encryption private key is not released prior to the time window closing then the second cryptographic asset is transferrable to the client address on the blockchain network; and broadcast said digital time-lock contract to the blockchain network for mining onto a blockchain.

22. An electronic device comprising:

an interface device;

a processor coupled to the interface device; and a memory coupled to the processor, the memory storing thereon computer executable instructions that, when executed, cause the processor to perform steps that:

construct a digital time-lock contract between an agent and a client on the blockchain network, the agent having an agent address on the blockchain network and an associated agent signature, and the client having a client address on the blockchain network and an associated client signature, the digital time-lock contract causing that:
(i) the agent holds the encryption private key corresponding to the encryption public key on the blockchain network and then releases the encryption private key to the blockchain network within a specified time window;
(ii) the agent provides a first cryptographic asset for holding and then releasing the encryption private key to the blockchain network within the specified time window, the first cryptographic asset being transferrable to the agent address on the blockchain network when the encryption private key is released to the blockchain network within the specified time window;
(iii) the client provides a second cryptographic asset to the agent for holding and then releasing the encryption private key to the blockchain network within the specified time window, the second cryptographic asset being transferrable to the agent address on the blockchain network when the encryption private key is released to the blockchain network within the specified time window;
(iv) if the encryption private key is released prior to the time window opening then the second cryptographic asset is transferrable to the client address on the blockchain network; and
(v) if the encryption private key is not released prior to the time window closing then the second cryptographic asset is transferrable to the client address on the blockchain network; and broadcast said digital time-lock contract to the blockchain network for mining onto a blockchain.

* * * * *